Figure 1:
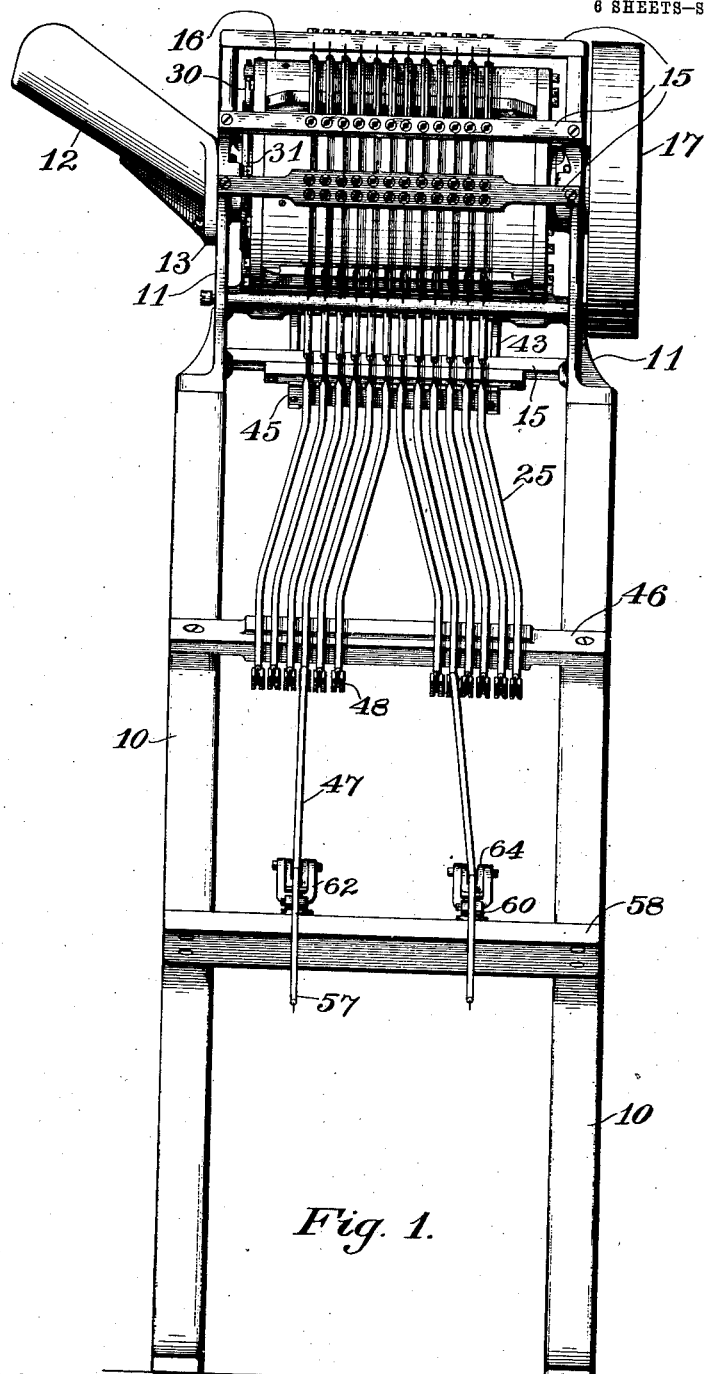

W. L. CURTIS.
EYE FEEDING MECHANISM.
APPLICATION FILED NOV. 10, 1908.

1,095,191. Patented May 5, 1914.
6 SHEETS—SHEET 1.

Witnesses:
Leon H. Horner.
C. I. Hartnett.

Inventor:
Walter L. Curtis
By Southgate & Southgate
Attorneys

W. L. CURTIS.
EYE FEEDING MECHANISM.
APPLICATION FILED NOV. 10, 1908.

1,095,191.

Patented May 5, 1914.
6 SHEETS—SHEET 3.

Witnesses:
Leon H. Horner
E. I. Hartnett

Inventor:
Walter L. Curtis
By Southgate & Southgate
Attorneys

W. L. CURTIS.
EYE FEEDING MECHANISM.
APPLICATION FILED NOV. 10, 1908.

1,095,191.

Patented May 5, 1914.
6 SHEETS—SHEET 4.

Witnesses:
Leon H. Horner
E. J. Hartnett

Inventor
Walter L. Curtis
By Southgate & Southgate
Attorneys

W. L. CURTIS.
EYE FEEDING MECHANISM.
APPLICATION FILED NOV. 10, 1908.
1,095,191.
Patented May 5, 1914.
6 SHEETS—SHEET 5.
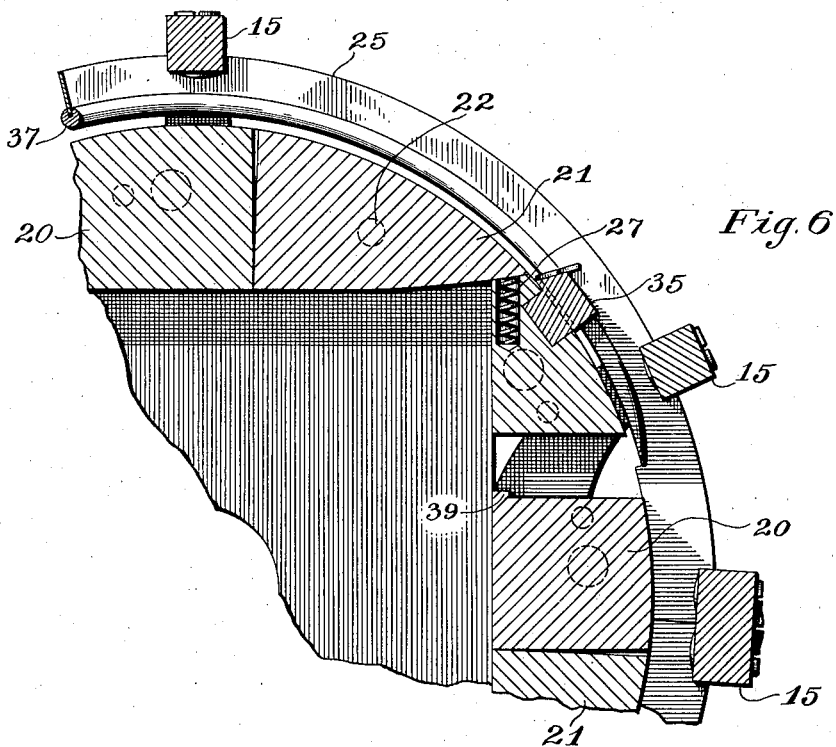
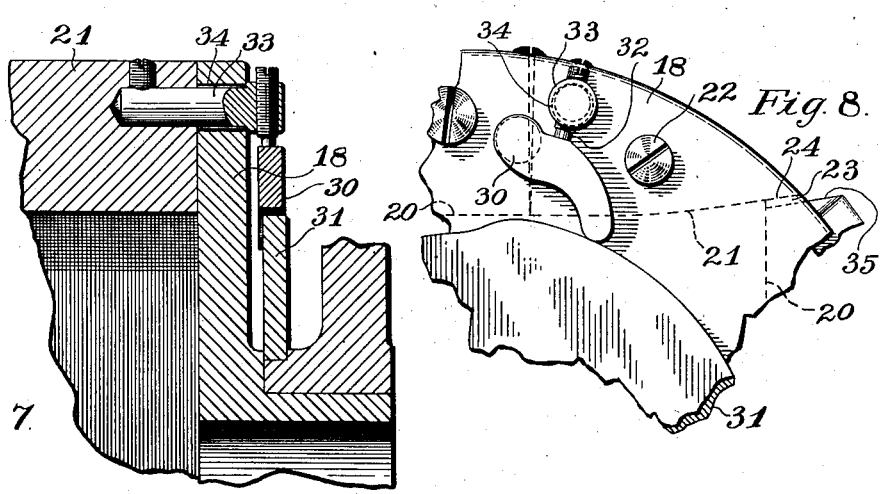
Witnesses:
Leon H. Horner
C. J. Hartnett
Inventor
Walter L. Curtis
By Southgate & Southgate
Attorneys W. L. CURTIS.
EYE FEEDING MECHANISM.
APPLICATION FILED NOV. 10, 1908.
1,095,191.
Patented May 5, 1914.
6 SHEETS—SHEET 6.
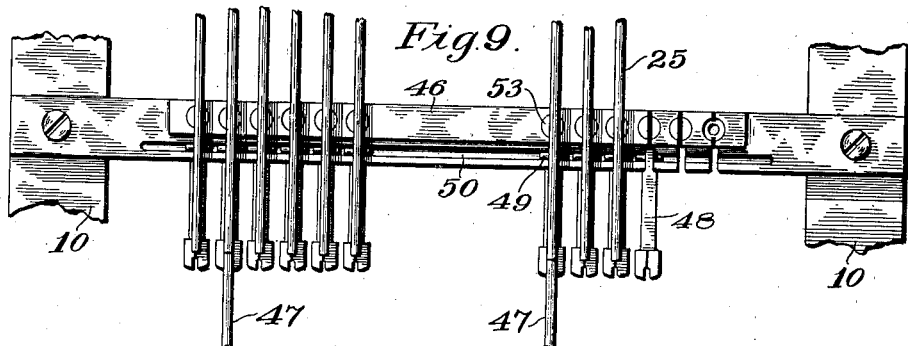
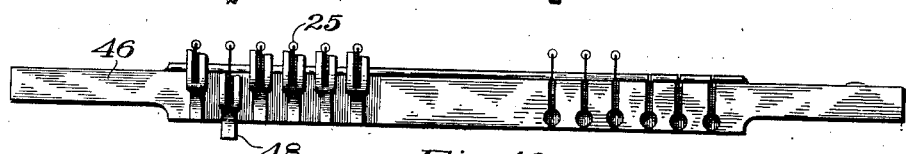
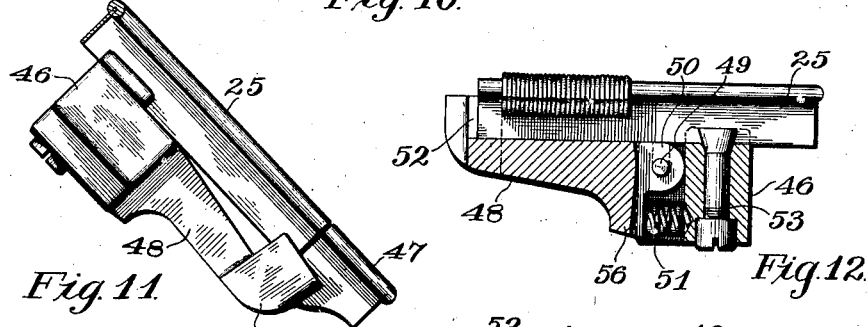
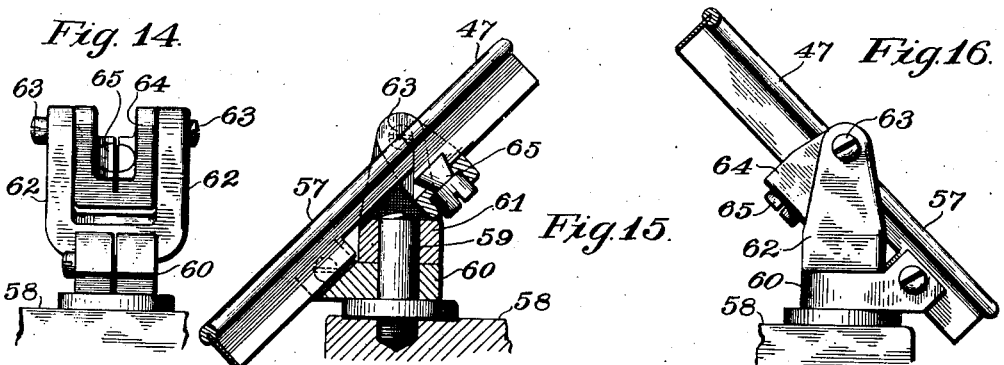
Witnesses:
Leon H. Horner
E. L. Hartnett
Inventor
Walter L. Curtis
By Southgate & Southgate
Attorneys

UNITED STATES PATENT OFFICE.

WALTER L. CURTIS, OF WORCESTER, MASSACHUSETTS, ASSIGNOR TO DE LONG HOOK AND EYE COMPANY, OF PHILADELPHIA, PENNSYLVANIA, A CORPORATION OF PENNSYLVANIA.

EYE-FEEDING MECHANISM.

1,095,191.      Specification of Letters Patent.      Patented May 5, 1914.

Application filed November 10, 1908. Serial No. 461,868.

*To all whom it may concern:*

Be it known that I, WALTER L. CURTIS, a citizen of the United States, residing at Worcester, in the county of Worcester and State of Massachusetts, have invented a new and useful Eye-Feeding Mechanism, of which the following is a specification.

This invention relates to a machine for feeding articles, and is especially adapted for feeding eyes, such as are ordinarily employed in connection with fastening hooks, but is capable of operation for the purpose of feeding other articles of somewhat similar shape.

The principal objects of the invention are to provide certain improvements in rotary eye-feeding hoppers of rotary type, such, for example, as that shown in my prior application on a machine for assembling hooks and eyes and attaching them to cards, Serial No. 421,347, filed March 16, 1908, whereby the movable plates of the walls thereof shall be positively and automatically actuated during each revolution to operate certain passages or conduits for receiving the eyes and directing them out of the hopper, and to release those which are carried around therein so as to allow them to drop back into the hopper, to provide means whereby the hopper may be emptied in a simple and convenient manner without taking it to pieces; to provide a plurality of eye-guides in connection with a movable guide adapted to connect with any one of them, said first named eye-guides having means for stopping the eyes thereon adapted to come into operative position automatically when the movable guide is removed and to move out of the way automatically when the movable guide is applied and to be held down thereby; to provide means preferably automatically actuated at each revolution to discharge surplus eyes from the eye-guides if any of them should get filled up so as to prevent clogging of the apparatus; to provide new and improved forms of mechanism for securing said results; and generally to improve and simplify the construction and operation of feeding devices suitable for feeding eyes and the like.

Reference is to be had to the accompanying drawings which show one form in which this invention may be carried out, and in which—

Figure 2:
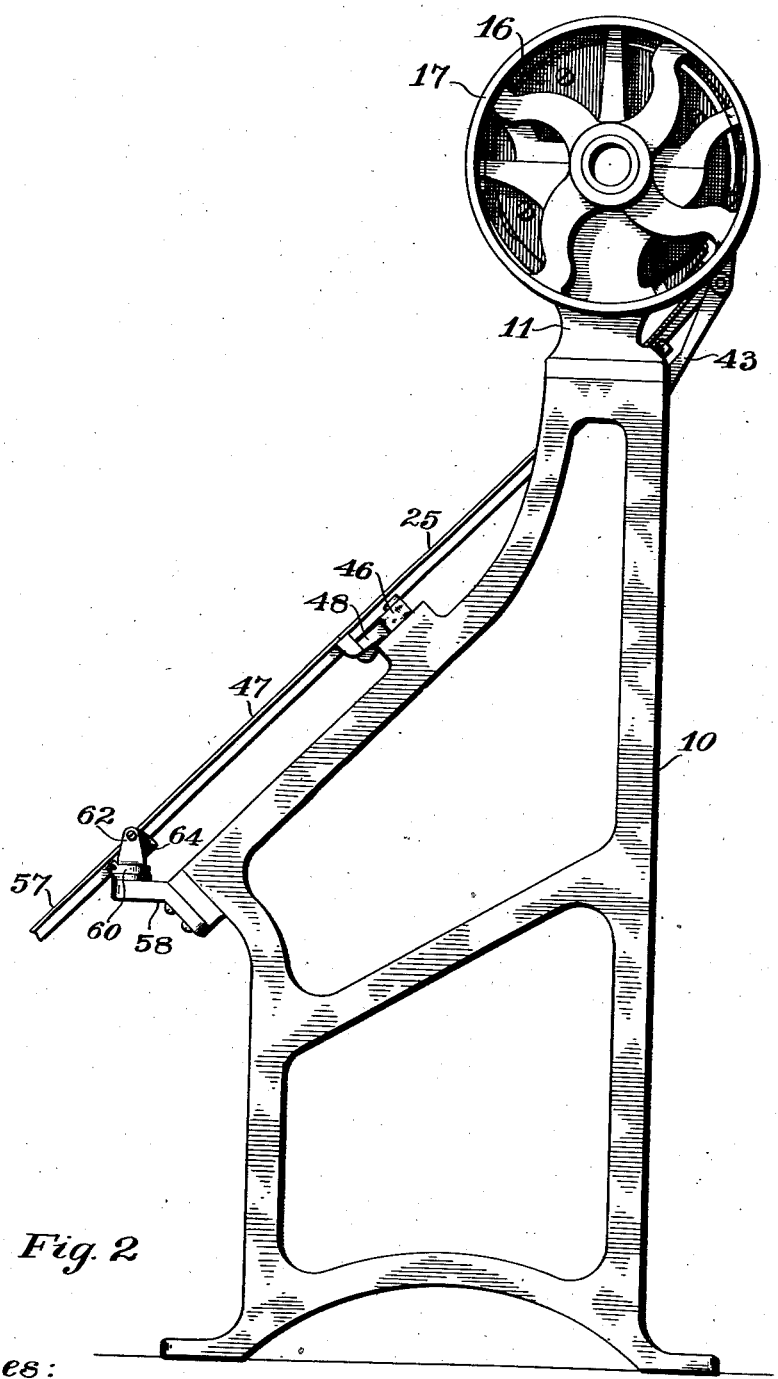
Figure 3:
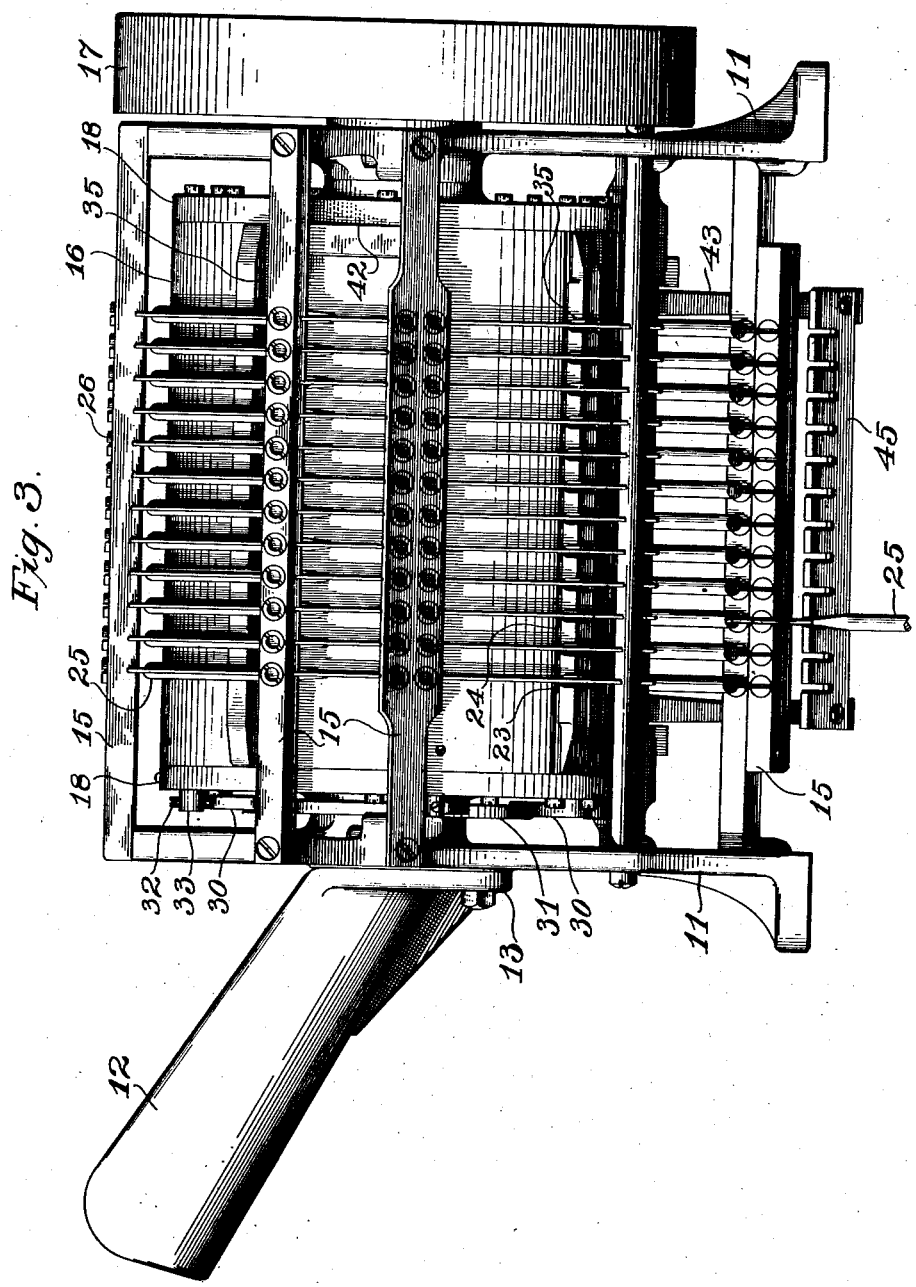
Figure 5:
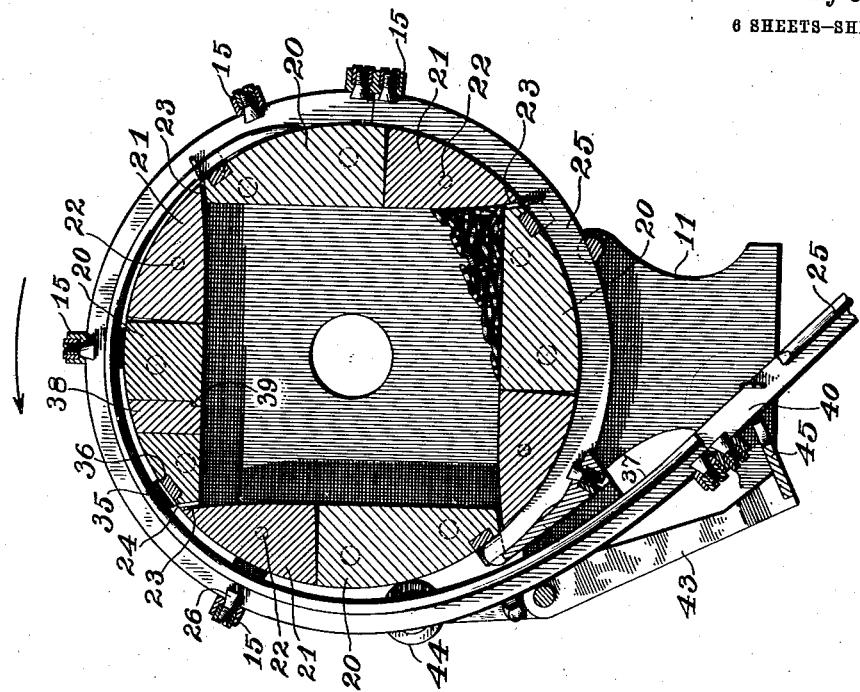
Figure 4:
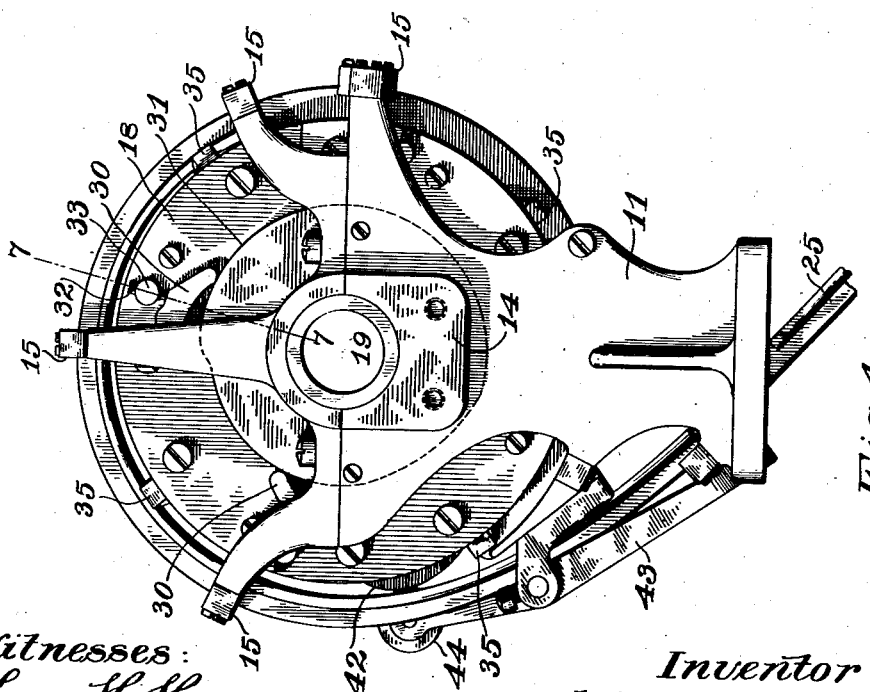

Figure 1 is a front elevation thereof; Fig. 2 is a side elevation; Fig. 3 is a front elevation of the rotary hopper; Fig. 4 is an end elevation of the rotary hopper showing a part of the eye-guides; Fig. 5 is a central transverse sectional view of the same; Fig. 6 is a fragmentary view of a similar character on an enlarged scale taken in a different plane; Fig. 7 is a sectional view on the line 7—7 of Fig. 4; Fig. 8 is an elevation of a portion of the front of the mechanism shown in Fig. 7; Fig. 9 is a plan of a portion of the eye-guides; Fig. 10 is a front elevation thereof; Fig. 11 is a side elevation of one of said guides showing the lower guide mounted thereon; Fig. 12 is a sectional view of the same taken longitudinally through the center; Fig. 13 is a plan of one of the details shown in Fig. 12; Fig. 14 is a front elevation of a portion of a swivel joint for supporting the lower eye-guide; Fig. 15 is a transverse central sectional view of the same showing the eye guide thereon; and Fig. 16 is an elevation of the same.

This invention is illustrated as constructed in a form adapted to feed eyes to be attached to fastening hooks, and in which a frame 10 supports end pieces 11, one of which carries a guide 12 into which the eyes are shoveled or otherwise placed in an indiscriminate manner. This guide is shown as having a flange 13 at the lower end thereof, by which it is secured to a face 14 on one of the end pieces 11. These end pieces are connected by a series of cross bars 15 so as to constitute a substantial frame for supporting the parts. Mounted to turn within this frame on suitable bearings is a rotary hopper 16 driven by a pulley 17 in any desired way. This hopper comprises a pair of ends 18 one of which has a central opening 19 through which the eyes are discharged to the interior of the hopper from the guide 12. The ends of the hopper are connected by means of a series of plates 20 which are fixed with respect to the end. These plates are supplemented by an equal number of swinging members 21 pivotally mounted on studs 22 screwed through the ends 18. Each plate 20 with its complementary member 21 forms a flat wall inside the hopper, each of these walls being at right angles to those on the two sides thereof in the form shown so that as the hopper turns the eyes will collect in a right angled trough formed between the adjacent walls. The inner surfaces of the plates 21 are curved away slightly to form a trough, which terminates in a series of passages 23 separated by partitions 24. The passages are of such size as ordinarily to admit one eye at a time in each of them, and the hopper is provided with any desired number of such passages arranged at each of the four corners of the hopper.

As the hopper rotates in the direction of the arrow in Fig. 5, the eyes gather in the trough at the bottom and a certain number of them descend into the passages 23. Obviously the eyes enter these passages in all positions. Now at the bottom of these passages, and under the rotating hopper are a series of curved feed or guide rods 25, each one bisecting one of the passages 23. These rods are shown as curved entirely around the hopper, and as supported by the crossbars 15 which are secured to them by means of draw screws 26 or in any other desired way. It will be obvious, therefore, that all the eyes which enter the passages 23 in such position that they straddle the rods will drop down into the position indicated at the bottom of Fig. 5 so that the upper or looped parts rest on top of the rod, while all the other eyes remain in the passages 23 above the rods 25. On the further rotation of the hopper the latter eyes are carried up in these passages until they reach nearly the top of the hopper, when they drop back into the interior thereof.

Many of the features described above are also included in my above mentioned application, but in that case the shape of the interior of the hopper is not as simple as in the present case, and the operation is different, as will appear from what follows.

Each of the stationary members 20 is provided with a spring 27 bearing on the adjacent end of the oscillating member 21 to yieldingly force said adjacent end out. When the swinging members 21 are in the position shown at the left of Fig. 5, the springs 27 act to hold them outwardly so as to leave the space in the passages 23 at the maximum. As each plate 21 reaches its lowermost position, a lever 30 mounted on the end 18 of the hopper moves along a stationary cam 31 and bears on a screw 32 adjustably mounted on a stud 33 which projects through an opening 34 in the end 18 and which is fixed to the plate 21. This causes the plate to be tilted so as to reduce the width of the passages to a minimum, when they are wide enough to receive one or two eyes, provided they enter parallel with each other and in normal position. When they reach the top of the hopper, the lever 30 drops off the projecting part of the cam and allows the springs to act to open the passages so as to free any eyes that may have been carried up them and allow them to drop back into the bottom of the hopper. These parts, therefore are positively operated, and do not depend on gravity, and the eyes are continually brought back into such position that they can be fed again into the passages 23 without discharging them from the hopper and replacing them therein.

The eyes which fall astraddle of the several rods 25 are pushed by the continued rotation of the hopper upwardly along said rods in the manner indicated in my above mentioned application for patent, by means of a series of followers 35 which are fixed to bars 36 mounted in the edge of each of the plates 20. They carry the eyes along the rods 25, thread them on beads 37 thereon, and leave them in a position at the opposite side of the hopper from which the eyes may descend by gravity along the rods which are continued down below the hopper.

In case it was necessary to empty the hopper the device shown in my above mentioned application had to be dismounted in order to get the eyes out of the hopper. In order to avoid this I have placed a removable bar 38 in one of the plates 20 of the hopper. The plate is provided with a passage having a projection 39 near the inner side thereof, and the removable bar is provided with a corresponding rabbet fitting the same so as to prevent its dropping into the hopper. This bar is secured in position by screws or in any other desired manner, and it can be easily removed to allow the eyes to be discharged.

The bead 37 is omitted for a short distance at the point 40 to provide a convenient place for removing any eyes that may become stuck together or lodged in any way. On account of the construction which will be described hereinafter, the filling up of one of the eye-conducting guides 25 is dependent upon the attention of the operator, and if the guides should be clogged up all the way into the hopper, it would interfere with the proper operation of the machine. Therefore I have now provided automatic means for removing the eyes as they rest on the guide so as to extend into the space 40. This is accomplished by providing a cam 42 rotating with the hopper and a lever 43 having a roll 44 thereon engaging said cam so as to be oscillated once during each rotation of the hopper. This lever is provided with a slotted plate 45 adapted to project over the guide at the point 40 and remove any eyes that happen to be located at that point. As the hopper will discharge not more than two eyes on each guide during a single rotation, it will be sufficient if this plate is wide enough to dislodge two eyes or three at each action. By this construction it will be impossible for the eyes to accumulate faster than this apparatus can remove them.

The rods 25 extend downwardly at an angle from the hopper so as to conduct the eyes away from the hopper by gravity. They are shown in Fig. 1 as arranged in two series, the lower ends being supported by a cross bar 46 on the frame. These guide rods are intended to discharge the eyes to one or more swinging guide rods 47 mounted below them. These guide rods are pivoted in a manner which will be described hereinafter, so as to swing on two axes and each one is capable of being connected with any one of one of the series of guide rods 25 so as to conduct the eyes from one of the latter guide rods at a time. It will be understood, of course, that while the eyes are being taken from one of the guide rods 25 the eyes accumulate on each of the others. In order to do this and to hold the eyes which are discharged on the other guide rods 25, each of the latter is provided with an automatic holding device at the bottom. This consists of a lever 48 pivoted by a stud 49 in an open topped slot 50 in a cross bar 46 and provided with a spring 51 for holding it up. Each one of these levers is provided with an end plate 52 which is moved upwardly by the spring so as to engage the end of the guide rod 25 and hold the eyes so that they will accumulate thereon. The top surface of the lever 48 in this position engages the lower surface of the guide rod 25, and its position is limited thereby. The feed rods 25 are secured to the cross bar by means of screws 53 having enlarged heads secured to the rods. Thus the parts are readily detachable.

The head or cross plate 52 of the lever is bifurcated and is provided with a narrow slot 54 for receiving the end of the guide rod 25, and with a wider open bottom slot 55 for receiving the end of the guide rod 47. Thus guide rod 47 is of sufficient weight to automatically turn the lever down out of operative position when the guide rod 47 is placed in the slot, and the lever is provided with a stop 56 for limiting the downward motion thereof and holding the guide rod 47 in registration with the guide rod 25, as indicated in Fig. 11.

The guide rods 47 are connected with one or more lower guide rods 57 and it will be readily understood that it is desirable to provide means whereby the former will deliver eyes to the latter in an uninterrupted and continuous manner irrespective of the position of the guide rods 47. In order to accomplish this result the ends of these two rods are mounted in the following manner. On a cross bar 58 is mounted a vertical stud 59 supporting two oscillatable plates 60 and 61, each adapted to turn about the stud 59 as axis. The plate 61 is mounted above the plate 60 and carries brackets 62 which are provided with a pair of studs 63, the axes of which are exactly in vertical alinement with the axis of the stud 59. On the studs 63 a frame 64 is pivoted and to this is connected the lower end of the guide rod 47. The bottom of the top edge of this guide rod comes exactly to the center of the axis of the stud 63, and the top of the guide rod 57 also comes exactly to the same point, so that upon turning the guide rod 47 about the axis of the stud 59 or the axes of the studs 63, the points at which the two guide rods come together at the top will always be in the same place, and therefore, the guide rods 47 will always deliver directly to the guide rods 57. The latter also are fixed to the swinging plate 60 and are adapted to be turned on the axis of the stud 59 without displacing their upper ends from registration with the lower ends of the guide rods 47. These guide rods are shown as fixed to their respective supports by means of a screw and nut construction 65 similar to those shown elsewhere in this case.

Although I have shown two of the guide rods 47 and 57 and referred to them in the plural, it will be understood that it is within the scope of this invention to arrange all of the guide rods 25 to deliver to a single guide rod 47 or to any other number of them.

While I have illustrated and described a preferred embodiment of the invention, I am aware that many modifications may be made therein by any person skilled in the art without departing from the scope of the invention as expressed in the claims. Therefore, I do not wish to be limited to all the details of construction shown, but What I do claim is:—

1. In a machine of the class described, the combination of a hollow rotatable hopper having interior substantially straight walls substantially parallel with the axis of rotation at right angles to each other and longitudinal passages at said angles whereby the eyes will be directed into said passages as the hopper rotates, and means outside the hopper for receiving the eyes when they are fed through the passages with their loop ends up and guiding them out of the passages as the hopper rotates.

2. A machine of the character described comprising a hollow rotary hopper having a series of passages therethrough, and slanting interior walls adapted to direct the eyes contained in the hopper into said passages, said walls comprising a series of movable members and positive means for moving said members as the hopper rotates so as to decrease the width of said passages.

3. A hollow rotatable eye feeding hopper having passages through which the eyes may be discharged, means adapted to operate as the hopper rotates, for positively reducing the width of said passages to a minimum and carrying the eyes around to the top of the hopper, and means for releasing such eyes and allowing certain of them to drop back into the hopper.

4. An eye feeding hopper comprising a series of plates having plane inside surfaces, a series of pivoted plates adjacent to the sides of said first named plates having substantially plane surfaces forming a continuation of the inside surfaces of the first named plates, said plates having passages between them for feeding eyes out of the hopper, said passages being located at the ends of said surfaces of the pivoted plates, and means whereby when the hopper rotates the pivoted plates will be thrown back to release eyes held in said passages and carried around by the rotation of the hopper.

5. In a machine of the class described, the combination of a rotary hopper having passages through its walls, and means for reducing the width of said passages to a minimum, yielding means for enlarging the passages during the rotation of the hopper, and a guide rod for each passage, said guide rods extending under the passages so as to prevent eyes from being discharged therethrough except when the eyes enter the passages in such position as to straddle said guide rods.

6. A rotary eye feeding hopper having discharge passages through its walls, movable plates for closing them, springs engaging the plates for opening said passages, and positive means for contracting the passages.

7. A rotary feeding hopper having discharge passages through its walls, resilient means for operating certain of said walls to open said passages and positive means for moving the walls to contract the passages comprising a stationary cam, and a lever carried with the hopper and controlled by the cam.

8. A rotary feeding hopper having movable walls and provided with discharge passages adjacent to said walls, and positive means for contracting the passages.

9. An eye feeding hopper having a plurality of walls each comprising a fixed plate and a movable plate, and a spring carried by each fixed plate and bearing on the next adjacent movable plate.

10. In a machine of the character described, the combination of a rotary hollow hopper for receiving eyes, a series of feed rods extending around said hopper and adapted to receive eyes therefrom said rods being inclined downwardlly from the hopper, and an inclined laterally movable guide located at the bottom of said feed rods for receiving the eyes therefrom.

11. In a machine of the class described, the combination of a series of guides, a laterally movable guide adapted to register with the ends of each of said series and means supported by each of the guides of said series for preventing the discharge of articles therefrom when not in registration with the movable guide.

12. In a machine of the class described, the combination of a series of guides, a laterally movable guide adapted to register with the ends of each of said series, and independent means connected with each of the guides of said series, each automatically movable independently of the others into position for preventing the discharge of articles from the guides when not in registration with the movable guide.

13. In a machine of the character described, the combination of means for feeding eyes, a series of guides for said eyes, a laterally movable guide for receiving eyes from any of said guides, means for preventing the discharge of eyes from said series of guides when not in registration with the laterally movable guide, and means controlled by said eye feeding means for removing surplus eyes from said series of guides.

14. In a machine of the class described, the combination of an eye feeding hopper, a series of guides for directing the eyes therefrom, and means controlled by said hopper for discharging the eyes from said guides when they accumulate at the top thereof.

15. In a machine of the character described, the combination of a hopper, and a guide for directing articles therefrom, having a bead on its top which is interrupted at a point near the discharge point of the hopper and continued beyond the interruption.

16. In a machine of the character described, the combination of a rotary hopper, guides for directing articles therefrom, each of said guides having a bead thereon which is interrupted at a point near the bottom of the hopper, and means controlled from the hopper for dislodging articles from said interrupted point on the guide.

17. In a machine of the character described, the combination of a rotary hopper, guides extending therefrom, a lever pivoted near said guides, and a cam rotating with the hopper for operating the lever to discharge surplus eyes from the guides.

18. In a machine of the character described, the combination of an inclined guide, a pivoted lever having a plate thereon normally in position to prevent the discharge of articles from said guide, and means for swinging said lever to bring said plate into position to permit the discharge of articles from said guides.

19. In a machine of the class described, the combination of a series of guides, a laterally movable guide adapted to register with the end of any one of said series, means for preventing the discharge of articles from the guides not in registration with the movable guide, said means comprising a pivoted lever having a plate thereon movable into position against the end of one of the guides, and yielding means for moving said lever against the guide.

20. In a machine of the character described, the combination of a hopper, a plate mounted to turn on a vertical axis, a horizontal pivot supported by said plate with its axis intersecting said vertical axis, a frame mounted to swing on the second pivot, an inclined guide supported by said frame, the lower end of which is at the point at which said axes intersect, a second plate supported to swing about the vertical axis, and a guide pivotally mounted on the second plate and adapted to register with the bottom of the first named guide in all positions thereof.

21. In a machine of the character described, the combination of a hopper, a plate mounted to turn on a vertical axis, a horizontal pivot supported by said plate, a frame mounted to swing on the said pivot, an inclined guide supported by said frame, a second plate supported to swing about the vertical axis, and a guide pivotally mounted on the second plate and adapted to register with the bottom of the first named guide in all positions thereof.

In testimony whereof I have hereunto set my hand, in the presence of two subscribing witnesses.

WALTER L. CURTIS.

Witnesses:
   ALBERT E. FAY,
   C. FORREST WESSON.